UNITED STATES PATENT OFFICE.

JOSEPH D. NEULS, OF LOS ANGELES, CALIFORNIA, ASSIGNOR, BY MESNE ASSIGNMENTS, TO THE PACIFIC R. & H. CHEMICAL CORPORATION, OF LOS ANGELES, CALIFORNIA, A CORPORATION OF CALIFORNIA.

INSECTICIDE AND FUMIGATION PROCESS.

1,381,586. Specification of Letters Patent. Patented June 14, 1921.

No Drawing. Application filed April 15, 1918. Serial No. 228,742.

*To all whom it may concern:*

Be it known that I, JOSEPH D. NEULS, a citizen of the United States, and a resident of Los Angeles, county of Los Angeles, and State of California, have invented a certain new and useful Insecticide and Fumigation Process, of which the following is a specification.

The invention relates to a composition of matter and a process for destroying insects, scale and other pests.

An object of the invention is to provide a material or mixture of materials and a process for killing insects and other pests.

A further object of the invention is to provide a composition of matter and a process for killing insects which is highly efficient in operation and of comparatively low cost.

The invention relates particularly but not exclusively, to the destruction of insects and scale on trees and this is ordinarily accomplished by covering the tree with a tent or other cover and releasing gaseous material under the tent, so that the tree may be subjected to the material. Hydrocyanic acid gas has heretofore been generally used as the material, but I have found that the effect of this fumigating agent or insecticide is often inefficient, resulting in the destruction of only a large percentage, but not all, of the insects.

An object of my invention, therefore, is to provide a material and a process which will result in practically 100% kill of the insects.

The invention possesses other advantageous features, some of which, with the foregoing, will be set forth at length in the following description, where I shall outline in full, the material of my invention and the process of employing it for the destruction of insects on trees. It is to be understood, however, that the material is not limited to the destruction of insects on trees, but may be employed against insects wherever they may be found.

Insects breathe by means of tracheal tubes leading from the stomata at the exterior end of the tube to a membrane at the interior extremity. This membrane is continually bathed by the body fluid, analogous to the blood of higher animals. Gases enter the tracheal tubes by two methods,—diffusion and by suction, produced by movements of the body segments. Gases pass through the membrane into the body fluid. In the case of oxygen the body fluid is purified.

Insect covering or skin is composed of a substance known as chitin which is hard and incapable of expansion. Growth takes place by a method called molting which consists of shedding the old skin and chitinizing or hardening the new. Molting occurs several times in the development of insects.

During the period of the molt insect activity is suspended and the insect is in a comatose or dormant condition. Respiration is at low ebb because of no movement in the body segments, gases passing into the tracheal tubes by diffusion only. Obviously, the circulatory system is sluggish and as a consequence the moisture content of the membrane is greatly below normal.

Hydrocyanic acid gas which is used extensively as an insecticide or fumigating agent, has a great affinity for moisture and being drawn into the tracheal tubes by body movement of the insect under normal conditions it is readily absorbed by the moist membrane and entering the body fluid deoxidizes the same, resulting in the death of the insect.

During the molting period hydrocyanic acid gas enters the tracheal tubes only by diffusion and as the moisture content of the membrane is low at this time little gas is absorbed. It is believed that during the molting periods insects will survive much stronger dosages of hydrocyanic acid gas than insects under normal conditions will. In certain localities favorable climatic conditions and vigorous, healthy trees promote rapid development of insects with a consequent over-lapping of generations resulting in an off-hatch condition so that 10–15% (estimated) of the insects are passing through a molt at any given time. This is probably one of the principal causes of unsatisfactory results in fumigation of citrus trees in certain localities in California. If only 5% of the insects survive treatment, where the development is rapid, the results obtained are not satisfactory for the production of fancy fruit. Dosage and exposure to hydrocyanic acid gas in these sections has been increased to the danger point, with but slight relief.

The purpose of the present invention is to provide a material and a process which will overcome the difficulty of poor kill outlined above and which will be equally effective against normal insects and those passing through the molt or comatose state. This is accomplished by using in connection with the hydrocyanic acid gas or other material possessing deoxidizing qualities, a material which stimulates activity in the body segments of the insect. For this purpose I prefer to use an irritant agent, such as mustard oil, formic acid or nitrous oxid and I believe that sulfurous acid, or chlorin gas, may also be advantageously used as the irritating agent. Besides stimulating activity in the body segments of the insect, with the result that the hydrocyanic acid gas is drawn into the tracheal tubes and into contact with the membrane, the irritant has an added toxic power against insects.

The irritant in the form of a gas may be mixed with the hydrocyanic acid gas in many ways, since it has neutral chemical properties with respect to the hydrocyanic acid gas. When used for the fumigation of trees, the gases may be introduced under the tent separately or together and the irritant may be used in gaseous or liquid form. If the pot method is used, the irritant will be put into the pot immediately preceding the placing of the solid cyanid therein. The heat of the reaction by which hydrocyanic acid gas is released, causes a discharge of irritant in gaseous form. If the hydrocyanic acid gas is generated away from the tree and is conducted under the tent, the irritant in the form of a gas is preferably mixed with the hydrocyanic acid gas on its way to the tent. If liquid hydrocyanic acid is used, the liquid irritant may be mixed directly therewith and the process which is adopted for gasifying the liquid hydrocyanic acid will also gasify the irritant.

I have demonstrated by experiment that by the use of these two gases, a much less amount of hydrocyanic acid gas is required for the fumigation of a given tree than when the hydrocyanic acid gas is used alone and that the percentage of kill is higher. The amount of hydrocyanic acid gas which may be employed to fumigate a given tree without damage to the tree is well known. The dosage required for various insects varies and the proportion of irritant to hydrocyanic acid also varies for various insects, but I have found that a mixture of one part of irritant to three parts of hydrocyanic acid or the equivalent of hydrocyanic acid in hydrocyanic acid gas, produces excellent results.

I claim:

1. A material for destroying insects or other pests, comprising a mixture of an agent, such as hydrocyanic acid gas, which has the property of deoxidizing the body fluid of the insect, and an agent, such as mustard oil, which has the property of stimulating activity in the body segments of the insect, or of irritating the body tissue of the insect.

2. A material for destroying insects or other pests, comprising a mixture of hydrocyanic acid gas and a material which irritates the body tissue of the insect.

3. The method of treating trees to destroy insects thereon, which consists in subjecting the tree to hydrocyanic acid gas mixed with another gas which has the property of irritating the body tissue of the insects or of stimulating activity in the body segments of the insects.

4. The method of destroying insects existing in a dormant condition which consists in surrounding the dormant insect with an envelop, impregnating the atmosphere in the envelop with material which irritates the insects sufficiently to cause respiration and material which when drawn into the body structure of the insect kills the insect.

In testimony whereof, I have hereunto set my hand at Los Angeles, California, this 9th day of April, 1918.

JOSEPH D. NEULS.

In presence of—
H. D. MACKINSON,
MARK WALKER.